June 24, 1930.   R. F. STEPHENSON   1,766,408
AUXILIARY WATER CIRCULATING MEANS FOR AUTOMOBILE
ENGINES USING THERMO-SIPHON SYSTEMS
Filed April 1, 1926
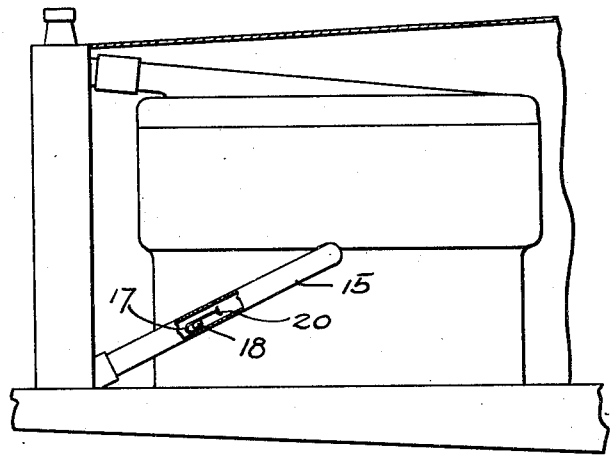
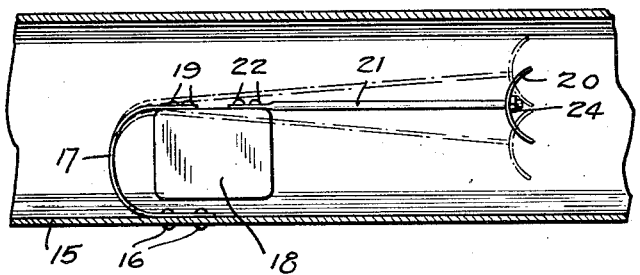
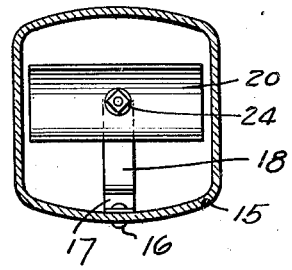
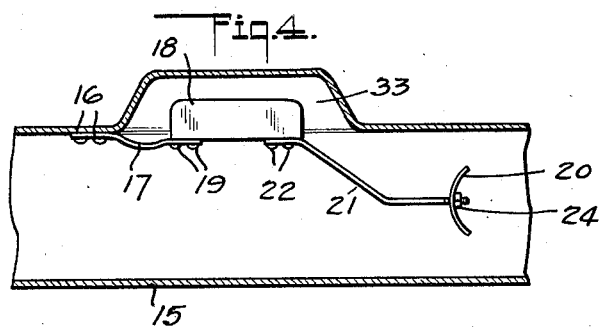
Inventor
Robert F. Stephenson Patented June 24, 1930

1,766,408

UNITED STATES PATENT OFFICE

ROBERT F. STEPHENSON, OF LOS ANGELES, CALIFORNIA

AUXILIARY WATER-CIRCULATING MEANS FOR AUTOMOBILE ENGINES USING THERMO-SIPHON SYSTEMS

Application filed April 1, 1926. Serial No. 98,979.

My invention relates generally to an auxiliary water circulating means, or pump, for automobile engines using thermo-siphon cooling system, in which the driving power is derived from the vibrations of the engine and the car's body.

It is a purpose of my invention to provide an auxiliary means of water circulation, in thermo-siphon systems, which will eliminate all belts, pulleys, gears, packing glands or parts that would wear or leak, and their attendant disadvantages, yet possessing a considerable means of boosting the water circulation.

It is also a purpose of my invention to provide an auxiliary water circulating means for automobile engines using thermo-siphon cooling system which will utilize the vibrations imparted to the car's body from the engine and from the road surfaces, to impart energy to the impeller, and which will not impede the thermo-siphon tendencies, if stopped, and will be very cheap to manufacture and easy to install.

I will describe only one form of my auxiliary water circulating means, embodying my invention, and will then point out the novel features thereof in claims.

In the drawings

Figure 1 is a sectional view of the water circulating means as it would appear in applied position on an automobile engine.

Figure 2 is a view showing in horizontal section one form of auxiliary water circulating means embodying my invention adaptable to form a section of the water circulating pipe.

Figure 3 is an end sectional view of Figure 2.

Figure 4 is a sectional view of a modified form showing the actuating weight pocketed out of the natural flow stream of the water.

Similar characters refer to similar parts in each of the several drawings.

Referring specifically to the drawings, my invention in its present embodiment is shown mounted inside of its jacket or section of the water circulating pipe 15, by means of rivets 16, a curved spring of resilient nonrusting metal 17 supports an actuating weight 18 by means of screws 19. The impeller 20 and rod 21 are attached to the actuating weight 18 by screws 22. The actuating weight 18 is of such shape and weight as to offer the least possible impedance to the water, yet be of sufficient weight to actuate the impeller 20 with maximum force. The impeller 20 is of thin light rust-resisting metal of semi-cylindrical shape and attached to rod 21 by a nut 24. The impeller, shaped as described and shown, will, when actuated up and down by weight 18, from the resultant forces imparted by the vibrations of the engine and from the car body, impel the water in a direction always away from the concave side of the impeller, whether the impulse be in one direction or the other. The flat shape of the spring 17, and the shape of the actuating weight 18 surrounded by water tend to impede side movements of the parts, and impart a resultant force in an up or down direction.

The operation of the water circulating means is as follows:

In the normal approximately horizontal position of the assembled parts as shown in Figure 2, the actuating weight 18 rod 21 and impeller 20 occupy a central or intermediate position within the water pipe or jacket 15 when at rest, but may be flexed to either of the positions as shown by the dotted figures, and any movement of the car body or engine must be conducted to the actuating weight 18 through the spring 17. Thus through the natural laws of gravity and momentum, the actuating weight 18 will acquire an undulating vibration which will be transmitted in a magnified amplitude through the rod 21 to the impeller 20, the magnified amplitude depending on the length of the rod 21. It is the intention to use a weight 18 and spring 17 of such respective weight and strength that striking the side of the pipe or jacket will seldom occur, and which will be in attune with the short quick vibrations of the car body and engine, and will be out of attune with the slower and larger undulations of the car body. The impeller 20, being thus reciprocated in a more or less continuous manner when the car is in motion, will impel the water always in a direction away from the concave side of the impeller, whether the movement of the impeller be up or down, and being mounted in such a position that the impetus of the water will be auxiliary to that from the thermo-siphon effect. The size or shape of the pipe or jacket 15, surrounding the assembled parts aforesaid, will be understood to be of such additional cross sectional area as to replace that occupied by the impeller and parts, so that the flow of the water will not be restricted to any extent, even though the impeller and parts become inactive or stop.

Figure 4 shows a modified form of the water circulating means, wherein the actuating weight 18 is suspended in a recess 33 out of the natural flow stream of the water.

Although I have herein shown and described only one form of the water circulating means or pump, embodying my invention, it is to be understood that various changes and modifications may be made therein without departing from the spirit of the invention, and the spirit and scope of the appended claims.

I claim:

1. In a combination with a water passage of an engine cooling system, a water circulating device in the passage comprising an impeller having a concave surface, and means for mounting the impeller for vibratory movement in response to vibration, whereby said concave surface will impel water in the passage in one direction constantly, to thereby effect uni-directional circulation of water in the system.

2. A water circulating device as embodied in claim 6 wherein the mounting means is so constructed as to restrict the impeller to vibratory movement in one plane.

3. A water circulating device comprising an impeller of concavo-convex form, spring means by which the impeller is adapted to be mounted for vibratory movement in a water passage of an engine cooling system, and a weight interposed between the impeller and spring means for prolonging the vibratory movement of the latter.

4. A water circulating device comprising an impeller of concavo-convex contour, and resilient means by which the impeller is adapted to be supported within a water passage of an engine cooling system for vibratory movement substantially parallel to the plane of said contour.

5. A water circulating device comprising an impeller of concavo-convex form, a rod secured to the impeller, a weight secured to the rod, and a leaf spring secured to the weight and adapted to be secured in a water passage of an engine cooling system so as to support the impeller for vibratory movement in the passage.

6. A water circulating device comprising an impeller, means for mounting the impeller in a water passage for vibratory movement in response to vibration, the impeller having a surface, portions of which diverge from each other and are responsive to vibratory movement of the impeller to impel water in the passage in one direction.

7. A water circulating device comprising an impeller, means for mounting the impeller in a water passage for vibratory movement in response to vibration, the impeller having a concave surface responsive to vibratory movement of the impeller to impel water in the passage in one direction.

8. A water circulating device comprising an impeller, and means for mounting the impeller in a water passage for movement in response to vibration, the impeller having a reaction surface positioned on the mounting means and shaped to cause water in the passage to react thereagainst and be impelled thereby in one direction when the impeller is moved.

9. A water circulating device as embodied in claim 8 wherein the mounting means comprises a resilient member.

10. A water circulating device as embodied in claim 8 wherein the mounting means comprises a resilient member and a weight carried thereby.

11. A water circulating device as embodied in claim 8 wherein the mounting means is constructed to restrict the impeller to vibratory movement in one plane.

12. A water circulating device comprising an impeller, and means for mounting the impeller in a water passage for vibratory movement in a path at an angle to the path of water flow in the passage, the impeller when moved in the passage presenting to water therein, a surface disposed at an angle other than a right angle to the path of water flow in the passage so that the water will react upon the surface and be impelled thereby in one direction.

ROBERT F. STEPHENSON.